UNITED STATES PATENT OFFICE.

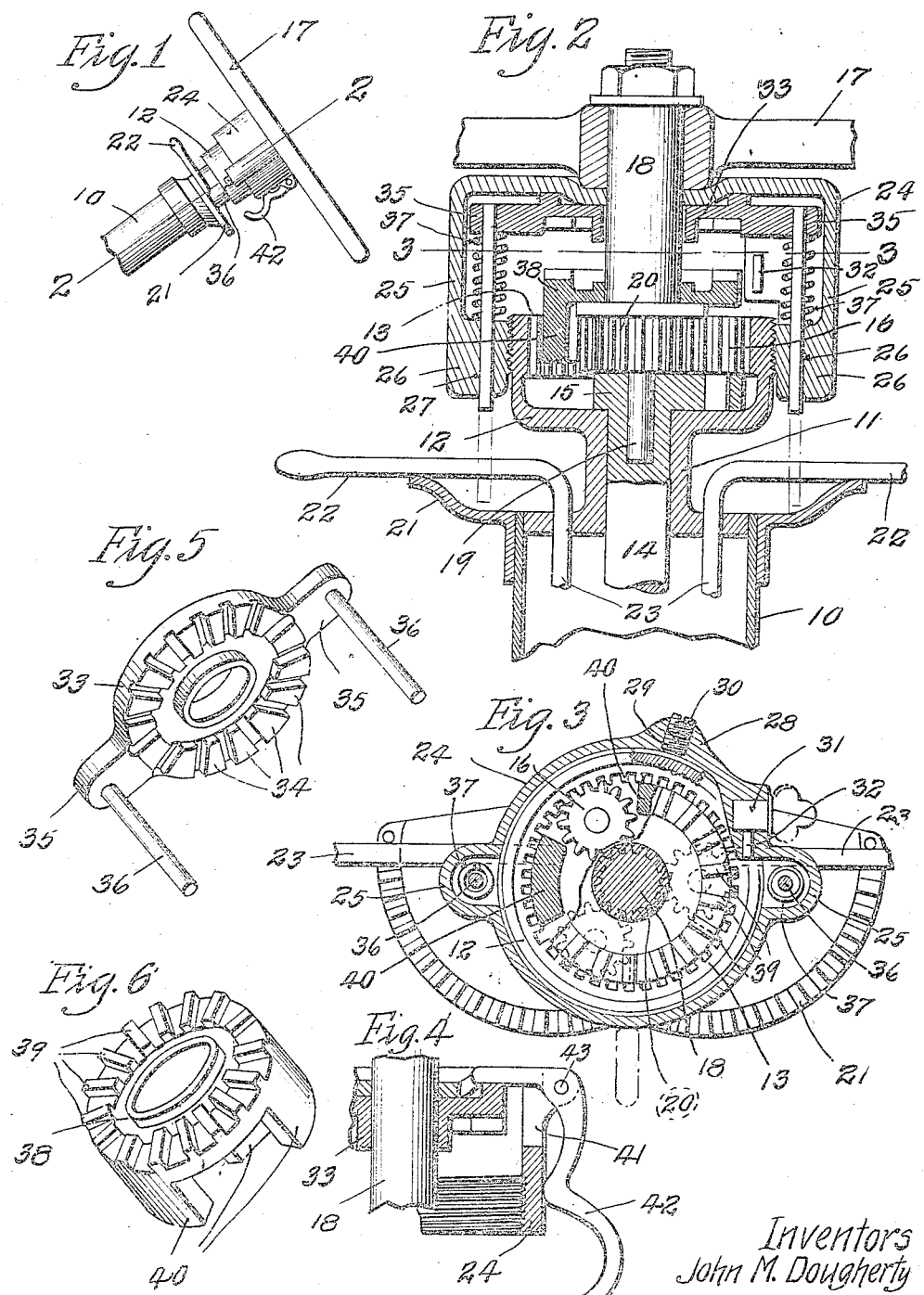

JOHN M. DOUGHERTY AND HARRY C. TABLER, OF ST. LOUIS, MISSOURI.

AUTOMOBILE-LOCK.

1,210,914.  Specification of Letters Patent.  Patented Jan. 2, 1917.

Application filed July 17, 1916.  Serial No. 109,793.

*To all whom it may concern:*

Be it known that we, JOHN M. DOUGHERTY and HARRY C. TABLER, citizens of the United States, residing at St. Louis, Missouri, have invented a certain new and useful Improvement in Automobile-Locks, of which the following is a full, clear, and exact description, such as will enable others skilled in the art to which it appertains to make and use the same, reference being had to the accompanying drawings, forming part of this specification.

Our invention relates generally to automobiles and more particularly to a lock for the control mechanism thereof, which latter includes the steering post and the spark and gas controlling levers.

The form of locking device herein shown and described is particularly adapted for the Ford make of automobiles, although, with minor changes in form and arrangement of parts, the device can be adapted for other makes of motor driven vehicles.

The locking device herein shown and described is an improvement on a corresponding device disclosed in our application filed December 1, 1915, Serial No. 64,440.

The principal object of our present invention is to provide a comparatively simple and inexpensive locking device which can be readily applied to the upper portion of the steering post and steering post sleeve of automobiles, particularly those of the Ford make, which locking device can be readily operated to effectivly lock the steering post against movement and likewise locking both the spark and gas control levers against actuation.

A further object of our invention is to provide a simple form of locking device which can be applied to the steering post and the sleeve thereof without in any way altering the construction of said parts or the parts associated therewith.

With the foregoing and other objects in view, our invention consists in certain novel features of construction and arrangement of parts, hereinafter more fully described, claimed and illustrated in the accompanying drawings, in which—

Figure 1 is a side elevational view of the upper portion of the steering post of an automobile and showing our improved locking device positioned thereupon. Fig. 2 is an enlarged section taken approximately on the line 2—2 of Fig. 1. Fig. 3 is a horizontal section taken approximately on the line 3—3 of Fig. 2. Fig. 4 is a detail sectional view showing a portion of the locking device and the member utilized for moving one of the locking members into locking position. Fig. 5 is a perspective view of the main locking member of the device. Fig. 6 is a perspective view of the secondary locking member.

Referring by numerals to the accompanying drawings, 10 designates the sleeve or housing for the steering post, 11 a bearing at the upper end of said sleeve, 12 a cup-shaped housing which is formed integral with said bearing, and 13 an internal gear which is formed in the upper portion of said housing.

The upper end of steering post 14 is journaled in bearing 11, and fixed on the upper end of said post and located within housing 12 is a plate or spider 15 which carries three loosely mounted pinions 16, the teeth of which mesh with the teeth of the internal gear 13.

A steering wheel 17 is rigidly fixed to the upper end of a comparatively short steering post section 18, the lower end of which latter is provided with a stem 19 which is loosely mounted in the upper end of post 14.

Fixed on the lower portion of member 18 is a pinion 20 which meshes with the pinions 16. Carried by the upper portion of sleeve or housing 10 is a plate 21 in the edge of which is formed suitable notches with which are adapted to engage the spark and throttle control levers 22, it being understood that these levers are connected to rods 23 which extend downward through sleeve or housing 10 to the spark and gas control devices which are associated with the internal combustion engine.

All of the devices just described are standard parts of the Ford make of automobiles.

Our invention includes an inverted cup-shaped housing 24 which takes the place of the usual housing that is positioned on housing 12 and serves as a bearing for shaft 18.

The lower end of housing 24 is internally threaded in order that it may be positoined upon the externally threaded upper end of housing 12.

Formed in the top of housing 24 is an opening which serves as a bearing for shaft 18 at a point immediately below the hub of steering wheel 17.

Formed in the vertical side wall of housing 24 are oppositely disposed pockets 25 and formed integral with said housing immediately below said pockets are blocks 26 through which are formed vertically disposed apertures 27.

Formed integral with the wall of housing 24 and near the lower end thereof is an outwardly projecting lug 28 through which is formed a screw-threaded aperture adapted to receive a set screw 29, the inner end of which bears against the threaded portion of member 12 to lock the member 26 in proper position thereupon. This set screw 29 is maintained in locking position by a short screw 30 which is inserted in the outer portion of the threaded aperture in lug 28 and bears against the outer end of said set screw.

Located in the vertical wall of housing 24 is a key-operated lock 31, preferably of the cylinder type, the bolt 32 of which is horizontally disposed and adapted to be projected into the chamber within said housing 24 to engage over a portion of one of the locking members as will be hereinafter more fully described.

Positioned within the chamber in housing 24 and arranged to slide freely on steering post section 18 is a circular plate 33 provided on its underside with a series of teeth 34 and formed integral with said plate are oppositely disposed outwardly projecting ears 35 which are loosely mounted in the pockets 25. Rigidly fixed in these ears are depending pins 36 which pass through the apertures 27 in blocks 26 and positioned on said pins and interposed between blocks 26 and ears 35 are compression springs 37. These springs normally maintain the plate 33 in position against the underside of the top plate of housing 24 with the lower ends of pins 36 elevated with respect to the levers 22. (See Fig. 2.)

Loosely mounted on the lower portion of steering post member 18 is a ring 38 on the upper side of which is formed a series of teeth 39 which are adapted to engage with teeth 34 on ring 33.

Depending from ring 38 is a series of three lugs or fingers 40 which occupy positions between the pinions 16. (See Fig. 3.)

Formed in the top and side of housing 24 is an opening 41, the same being occupied by the upper portion of a bell crank 42, the latter being fulcrumed on a pin 43 which is seated in ears formed on housing 24 to the sides of slot 41. The shorter horizontal arm of this bell crank overlies the edge of ring 33 while the longer curved arm of said bell crank extends downward to the side of the housing. (See Fig. 4.)

When our improved device is in normal or unlocked position, the various parts occupy the positions as seen in Fig. 2, it being understood that springs 37 maintain plate 33 in an elevated position and disengaged from the teeth of plate 38. With the parts so positioned, the rotary movement of steering post section 18 resulting from a manipulation of steering wheel 17 will be transmitted through pinions 15 and 16 to post 14, and as the pinions 16 move around within housing 12, plate 38 will be correspondingly moved by reason of its depending fingers 40 which are positioned between said pinions.

When it is desired to move the device into locking position, the lower end of the curved arm of bell crank 42 is engaged and pulled outward and upward, with the result that the short arm of said bell crank bears on top of plate 33 and moves the same downward against the resistance offered by springs 37. This movement is continued until the teeth 34 of plate 33 engage with teeth 39 of plate 38 and when such engagement takes place, the lower ends of the pins 36 will be positioned directly in front of the levers 22, it being understood that these levers have previously been shifted into out-of-service positions at the ends of the notched segments on plate 21. The operator now turns the key of lock 31 so as to shift bolt 32 outward, consequently positioning the outer portion of said bolt above that portion of the ear 35 which occupies the adjacent pocket 25. Thus, the plate 33 and parts carried thereby are locked in their shifted positions and as plate 38 is engaged by the teeth of said plate 33, said plate 38 cannot be rotated, and consequently pinions 16 are locked against movement, thus rendering the steering mechanism inoperative. Thus, with the various parts of the device in locking position, it will be impossible to manipulate the throttle and spark control levers, and likewise it will be impossible to move the steering wheel 17 in either direction.

To release the locking mechanism it is only necessary to manipulate the lock 31 so as to retract bolt 32 from its locking position, which action permits plate 38 to move upward into its normal position under the influence of springs 37 and with the parts so positioned, the steering wheel is free to be moved in either direction and the throttle and gas control levers can be actuated as desired.

While we have shown and described a key-controlled lock for engaging plate 33 and parts carried thereby, and maintaining the same in locking position, it will be understood that other forms of locks, for instance, a combination lock, can be utilized with advantage.

A locking device of our improved construction is comparatively simple, can be cheaply manufactured, can be readily applied to the steering post and its housing without changing the construction of any of the parts thereof, and said device in service forms an effective lock for the steering post and spark and gas control levers of an automobile, and particularly those of the Ford make.

It will be readily understood that minor changes in the size, form and construction of the various parts of our improved locking device can be made and substituted for those herein shown and described, without departing from the spirit of our invention, the scope of which is set forth in the appended claims.

We claim:

1. The combination with a steering gear including a rotary steering post, a wheel, a stationary gear, a drive pinion operated by the wheel, planetary pinions meshing with said drive pinion and the stationary gear, of a member loosely mounted on the steering post and having parts normally positioned between the planetary pinions, and a non-rotating locking member adapted to engage said loosely mounted member for holding the same against rotary movement.

2. The combination with a steering gear including a rotary steering post, a wheel, a stationary gear, a drive pinion operated by the wheel, planetary pinions meshing with said drive pinion and the stationary gear, of a member loosely mounted on the steering post and having parts normally positioned between the planetary pinions, a non-rotating locking member adapted to engage said loosely mounted member for holding the same against rotary movement, and means for locking the non-rotatable member in engagement with the loosely mounted member.

3. The combination with a steering gear including a steering post, a wheel, a stationary gear, a drive pinion operated by the wheel, and planetary pinions meshing with said stationary gear and pinion, of a member loosely mounted on the post and having parts normally positioned between the planetary pinions, and a non-rotating member, parts of which are adapted to interlock with parts of the loosely mounted member.

4. The combination with a steering gear including a steering post, a wheel, a stationary gear, a drive pinion operated by the wheel, and planetary pinions meshing with said stationary gear and pinion, of a member loosely mounted on the post and having parts normally positioned between the planetary pinions, a non-rotating member, parts of which are adapted to interlock with parts of the loosely mounted member, and means for locking the non-rotating member and loosely mounted member in engagement with each other.

5. The combination with steering gear, including a rotary steering post, a wheel, a stationary gear, a drive pinion operated by the wheel, and planetary pinions meshing with the stationary gear and drive pinion, of a member loosely mounted on the post and having parts normally positioned between the planetary pinions, non-rotating means adapted to engage said loosely mounted member for holding the same against rotation, and means for moving said non-rotating means into engagement with said loosely mounted member.

6. The combination with steering gear, including a rotary steering post, a wheel, a stationary gear, a drive pinion operated by the wheel, and planetary pinions meshing with the stationary gear and drive pinion, of a member loosely mounted on the post and having parts normally positioned between the planetary pinions, non-rotating means adapted to engage said loosely mounted member for holding the same against rotation, means for moving said non-rotating means into engagement with said loosely mounted member, and means to lock said non-rotating means in engagement with said loosely mounted member.

7. The combination with the spark and gas control levers of an automobile and the steering gear, which latter includes a rotary steering post, a wheel, a stationary gear, a drive pinion operated by the wheel, and planetary pinions meshing with the stationary gear and pinion, of a member loosely mounted on the post and having parts normally positioned between the planetary pinions, non-rotating means adapted to move into locking coöperation with the loosely mounted member, and means carried by said non-rotating means and adapted to move into the path of travel of the spark and throttle control levers when said non-rotating means is in engagement with said loosely mounted member.

8. The combination with the spark and gas control levers of an automobile and the steering gear, which latter includes a rotary steering post, a wheel, a stationary gear, a drive pinion operated by the wheel, and planetary pinions meshing with the stationary gear and pinion, of a member loosely mounted on the post and having parts normally positioned between the planetary pinions, non-rotating means adapted to move into locking coöperation with the loosely mounted member, means carried by said non-rotating means and adapted to move into the path of travel of the spark and throttle control levers when said non-rotating means is in engagement with said loosely mounted member, and means for locking said non-rotating means in engagement with the loosely mounted member.

In testimony whereof we hereunto affix our signatures, in the presence of two witnesses, this 29th day of June, 1916.

JOHN M. DOUGHERTY.
HARRY C. TABLER.

Witnesses:
M. P. SMITH,
M. A. HORDEL.